United States Patent
Tichy et al.

(10) Patent No.: US 8,433,480 B2
(45) Date of Patent: Apr. 30, 2013

(54) METHOD AND DEVICE FOR TRIGGERING PERSONAL PROTECTION MEANS DURING A ROLLOVER ACCIDENT

(75) Inventors: Marc A. Tichy, Tuebingen (DE); Andreas Schaefers, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 673 days.

(21) Appl. No.: 11/989,877

(22) PCT Filed: Aug. 2, 2006

(86) PCT No.: PCT/EP2006/064966
§ 371 (c)(1),
(2), (4) Date: Apr. 20, 2010

(87) PCT Pub. No.: WO2007/033853
PCT Pub. Date: Mar. 29, 2007

(65) Prior Publication Data
US 2010/0211245 A1    Aug. 19, 2010

(30) Foreign Application Priority Data
Sep. 20, 2005   (DE) .................. 10 2005 044 763

(51) Int. Cl.
*B60R 22/00*   (2006.01)
(52) U.S. Cl.
USPC .............................. 701/46; 701/45
(58) Field of Classification Search .......... 701/45, 701/46; 307/10.1; 280/728.1, 734, 735
See application file for complete search history.

(56) References Cited

U.S. PATENT DOCUMENTS

| 6,625,564 | B2 | 9/2003 | Mattes et al. | |
| 6,687,576 | B2 | 2/2004 | Mattes et al. | |
| 6,796,397 | B2 * | 9/2004 | Lahmann et al. | 180/282 |
| 2006/0229783 | A1 | 10/2006 | Lahmann et al. | |

FOREIGN PATENT DOCUMENTS

| DE | 10303149 | 7/2004 |
| DE | 102004008602 | 9/2005 |
| DE | 102004008602 A1 * | 9/2005 |
| EP | 1258399 | 11/2002 |
| WO | WO 01/79035 | 10/2001 |
| WO | WO 01/79036 | 10/2001 |
| WO | WO 2005/061283 | 7/2005 |

OTHER PUBLICATIONS

International Search Report, PCT International Patent Application No. PCT/EP2006/064966, dated Nov. 6, 2006.

* cited by examiner

*Primary Examiner* — Michael McCullough
(74) *Attorney, Agent, or Firm* — Kenyon & Kenyon LLP

(57) ABSTRACT

A device and a method for triggering personal protection devices, characterized in that a roll rate sensor generates a roll rate while an acceleration sensor detects the transverse acceleration and the vertical acceleration. An integrator is provided to integrate the roll rate to yield an angle. The integrator starts integrating the roll rate when the roll rate exceeds a first threshold value and it stops the integration when the roll rate falls below a second threshold value. In addition, a threshold value controller is provided, adjusting the first and/or second threshold value according to the transverse and/or vertical acceleration. A processor triggers personal protection devices according to the angle and other criteria.

10 Claims, 2 Drawing Sheets

METHOD AND DEVICE FOR TRIGGERING PERSONAL PROTECTION MEANS DURING A ROLLOVER ACCIDENT

FIELD OF THE INVENTION

The present invention relates to a device and a method for triggering personal protection means during a rollover accident.

BACKGROUND INFORMATION

European Patent No. 1 258 399 B1 describes that at least the rotational speed, i.e., the roll rate, and accelerations in the vertical and transverse directions of the vehicle must be taken into account when activating an occupant protection application in a motor vehicle during a rollover accident. In another embodiment, the rotational angle may also be determined.

SUMMARY

A device according to an example embodiment of the present invention for triggering a personal protection device during a rollover accident and the corresponding method may have the advantage that integration of the roll rate is started and stopped by adaptive threshold values. It is thus possible to begin integration of the roll rate at a very early point in time situationally, so that the personal protection device may then also be triggered earlier because the roll angle as a triggering criterion thus increases more rapidly and therefore results in triggering at an earlier point in time in a threshold value comparison. The transverse acceleration and vertical acceleration of the vehicle are used to determine these threshold values, which define the start and stop of integration. These two acceleration components are helpful in a plausibility check on the roll rate because these two accelerations span the plane in which the rolling movement occurs. Due to the reduction in thresholds, which determine the integration, an early start of roll angle integration is achieved in driving maneuvers with high vertical and transverse accelerations, thereby gaining valuable time for generating the earliest and most reliable possible triggering decision. The value by which the thresholds are then reduced depends on the particular application and is therefore adjustable. In particular it is possible to define whether the first threshold value and/or the second threshold value is/are altered. In particular by reducing the second threshold, i.e., the threshold that triggers termination of integration when a value falls below it, a good accuracy with respect to the actual roll angle is thus also achieved even at times of low roll rates. The alteration, i.e., reduction, of the first and second threshold values may thus remain active as long as the conditions for reducing the threshold values prevail. If necessary, it is also possible to use time constants, i.e., the threshold values are altered for a predefined or adaptively determined period of time. The example method and the device according to the present invention may produce an increased stability and early triggering reliability of the triggering algorithm. The example method and the device according to the present invention are easily integrable into existing systems.

It may be particularly advantageous if a roll angle is determinable from the transverse acceleration and the vertical acceleration, namely using a known equation, and then this roll angle may be subjected to a threshold value test to adjust the first and second threshold values for the integration as a function of this comparison.

In addition, it is advantageous that for determining the alteration of the first and second threshold values, the transverse and vertical accelerations are each subjected to a threshold value comparison, and a combination of transverse acceleration and vertical acceleration may also be subjected to a single threshold value comparison. The period of time during which the transverse acceleration and vertical acceleration exceed such threshold values may also be taken into account in determining the alteration of the first and second threshold values for the roll rate.

BRIEF DESCRIPTION OF THE DRAWINGS

Exemplary embodiments of the present invention are depicted in the figures and explained in greater detail below.

DETAILED DESCRIPTION OF EXAMPLE EMBODIMENTS

Statistics from the United States show the importance of passive safety in vehicle rollover accidents. In 1998, half of all fatal single vehicle accidents were attributed to a vehicle rollover. Vehicle rollovers account for approximately 20% of all accidents.

The roll angle may be used as a decision-making criterion for triggering personal protection device in a vehicle rollover. The roll angle may be determined by integration of the rotational rate about the longitudinal axis of the vehicle. Because of sensor noise, the required rotational rate is selected to be high accordingly, so as not to activate the angle integrator too often. The problem here is that the angle integrator therefore in general runs behind the actual roll angle and therefore triggering decisions may only be made at a later point in time. In addition, with a slow rollover at a low rotational rate, the rollover may not be recognized until very late or not at all.

According to example embodiments of the present invention, it is proposed that the angle integrator be provided with adaptive threshold values to optimize the integration. Advantageously, the vertical and transverse acceleration of a vehicle are used to determine these threshold values, reaching relatively high levels even before the occurrence of a definitive roll rate. To cause a vehicle to roll over, there must first be forces that generate a rotational rate. These forces are measurable by acceleration sensors and may thus be used as an early indicator of a possibly unstable vehicular condition because they occur before the roll rate.

Figure 1:
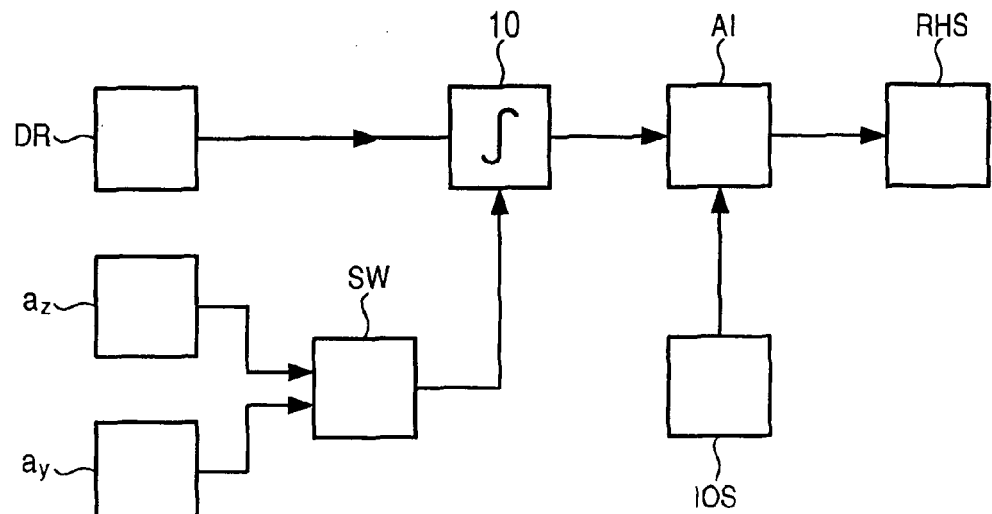
FIG. 1 shows a block diagram of an example device according to the present invention.

FIG. 1 illustrates an example device according to the present invention in a block diagram. A roll rate sensor DR is connected to an integrator 10, so that the roll rate may be integrated to yield a roll angle. In the present case, this integration is part of a microcontroller µC and is implemented in software. The integration may be situated outside of microcontroller µC in the control unit for triggering the personal protection device. Roll rate sensor DR is a micromechanical sensor optimized for detection of the rotational rate. Integration in integrator 10 begins when the roll rate has exceeded a first threshold value. It ends when the roll rate has fallen below a second threshold value. The second threshold value is therefore lower than or identical to the first threshold value. These two threshold values for starting and stopping integration are determined adaptively according to the present invention. These values are determined by using the signals of an acceleration sensor in the vehicle in vertical direction az and in transverse direction ay of the vehicle. For detecting this acceleration, micromechanical sensors or sensor systems are also used. These acceleration values go to a threshold value controller SW after filtering, amplification and digitization. From the vertical and transverse accelerations of the vehicle, threshold value controller SW determines the first and second threshold values, which in turn determine the start and end of roll rate integration. In the present case, threshold value controller SW does this by threshold value comparisons of the vehicle transverse and vertical accelerations. In other words, when the vehicle transverse and/or vertical acceleration exceeds predefined threshold values, this results in a reduction of the first or second threshold value for the roll rate. As an alternative, it is also possible to provide here for the integrated vehicle transverse acceleration and vertical acceleration to be used instead of the vehicle transverse acceleration and the vertical acceleration. Averaging or a similar method is also possible here. In addition, it is also possible for the threshold values for the roll rate not to be altered if only the vehicle transverse acceleration or only the vehicle vertical acceleration falls below the threshold value while the other acceleration does not exceed the threshold value. However, it is also possible for the threshold values for the roll rate to be reduced when only one of these threshold values is exceeded. In an alternative embodiment, it is possible for the roll angle to be determined from the vehicle transverse acceleration and the vehicle vertical acceleration using the following equation:

$$\alpha = \frac{-a_y \cdot g + a_g \cdot v^2/r}{g^2 + (v^2/r)^2}$$

where ay denotes the vehicle transverse acceleration, az is the vehicle vertical acceleration, g is acceleration due to gravity, $v^2/r$ is the centripetal acceleration. The centripetal acceleration may be the only value to be determined, namely using the following equation:

$$v^2/r = \pm \sqrt{a_y^2 + a_z^2 - g^2}$$

This roll angle, which is determined from the first equation, may also be compared with a predefined threshold value to determine the first and second threshold values for the roll rate. As soon as this threshold value is exceeded, a corresponding roll angle of the vehicle would be assumed and the thresholds for the roll rate would be actively reduced if the integrator has not yet been started.

Integrator 10 now supplies the roll angle determined by integration of the roll rate to algorithm Al. From the roll angle and other parameters, e.g., the instantaneous roll rate and/or acceleration values and/or the occupant identifier and classification, determined by a passenger compartment sensor IOS, algorithm Al determines whether or not restraining devices in the vehicle are to be triggered. Depending on that result, personal protection devices RHS such as airbags or seat belt tighteners or roll bars are then triggered. Algorithm Al, integrator 10, and threshold value controller SW are implemented here as software functions in a microcontroller μC in a control unit for triggering personal protection devices RHS. The other components may be situated inside or outside the control unit.

Figure 2:
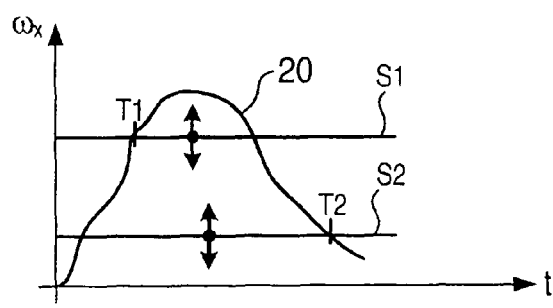
FIG. 2 shows a diagram of roll rate over time.

In a diagram of roll rate over time, FIG. 2 illustrates the function executed by integrator 10. Time is plotted on the abscissa and roll rate ωx is plotted on the ordinate. Curve 20 shows the curve of roll rate ωx. At a point in time T1, roll rate 20 exceeds a first threshold value S1. Integration of the roll rate is thus started at this point in time. At a point in time T2, roll rate 20 falls below second threshold value S2, i.e., integration is stopped at point in time T2. The result is the roll angle, which is supplied to the algorithm. According to the present invention, threshold values S1 and S2, indicated by the arrows, are altered as a function of the transverse and vertical accelerations of the vehicle.

Figure 3:
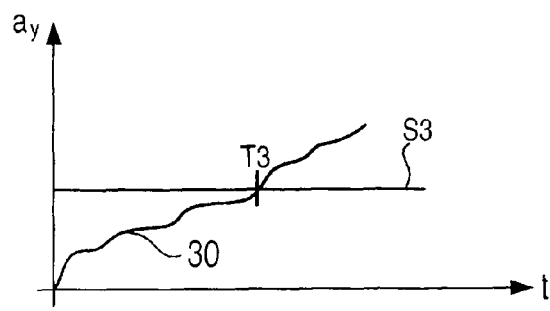
FIG. 3 shows a diagram of transverse acceleration over time.

In a diagram of vehicle transverse acceleration over time, FIG. 3 illustrates which events form the basis for an alteration of threshold values S1 and S2. Vehicle transverse acceleration ay is plotted on the ordinate and time t on the abscissa. Curve 30 shows the curve of the vehicle transverse acceleration as a function of time. At a point in time T3, vehicle transverse acceleration ay exceeds threshold value S3. Threshold value S3 here is used for testing whether threshold values S1 and S2 must be altered on the basis of a signal ay. This is achieved at point in time T3, which means that the vehicle transverse acceleration is so great that thresholds S1 and S2 must be reduced.

Figure 4:
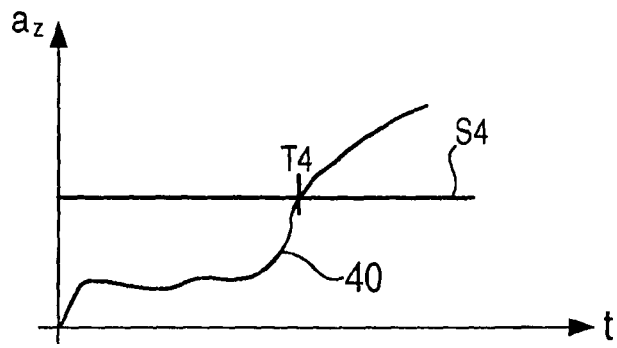
FIG. 4 shows a diagram of vertical acceleration over time.

FIG. 4 shows a corresponding time diagram for the vehicle vertical acceleration as a function of time. Time t is again plotted on the abscissa and vehicle vertical acceleration az is plotted on the ordinate. Curve 40 shows the vehicle vertical acceleration as a function of time. At a point in time T4, curve 40 exceeds threshold value S4. This means that in the threshold value controller, it has now been ascertained that curve 40, i.e., vehicle vertical acceleration, is greater than threshold value S4. Threshold values S1 and S2 may thus be reduced accordingly.

Figure 5:
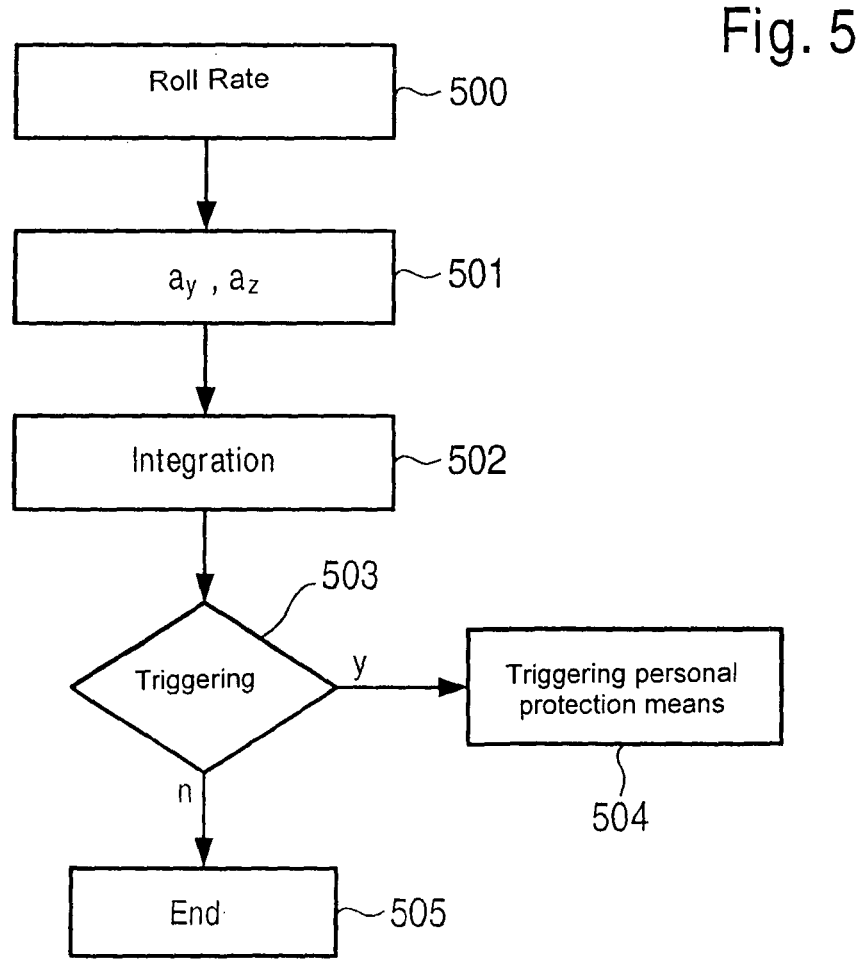
FIG. 5 shows a flow chart.

FIG. 5 illustrates the method according to the present invention in a flow chart. In method step 500, the roll rate is determined by a rotational rate sensor DR. In method step 501, the vehicle transverse acceleration and vehicle vertical acceleration are determined by acceleration sensors az and ay. The roll rate is integrated in method step 502. The integration of the roll rate is determined after the roll rate exceeds threshold values S1 and S2. These values are altered as a function of the vehicle transverse acceleration and vehicle vertical acceleration. The resulting roll angle is tested in method step 503 with a triggering criterion, i.e., a threshold value; if the roll angle is large enough and if other conditions relevant to triggering are met, then triggering occurs in method step 504 and thus the personal protection means are triggered. If the roll angle is not large enough, there is no triggering and the method ends in method step 505.

What is claimed is:

1. A device for triggering a personal protection device in a rollover accident, comprising:
   a roll rate sensor adapted to determine a roll rate;
   an acceleration sensor adapted to detect a transverse acceleration and a vertical acceleration;
   an integrator adapted to integrate the roll rate to form an angle, the integrator being configured in such a way that integration of the roll rate starts when the roll rate exceeds a first threshold value and ends when the roll rate falls below a second threshold value;
   a threshold value controller adapted to adjust at least one of the first threshold value and the second threshold value as a function of at least one of the transverse acceleration and the vertical acceleration; and
   a processor adapted to trigger the personal protection device as a function of the angle, wherein the processor is adapted to determine a roll angle from the transverse and vertical accelerations and the threshold value controller adjusts the first and second threshold values as a function of the roll angle, and wherein the threshold value controller subjects the transverse and vertical accelerations to a threshold value comparison and determines the first and second threshold values as a function of the comparison.

2. The device as recited in claim 1, wherein the processor is adapted to determine a roll angle from the transverse and vertical accelerations and the threshold value controller adjusts the first and second threshold values as a function of the roll angle.

3. The device as recited in claim 1, wherein the threshold value controller subjects the transverse and vertical accelerations to a threshold value comparison and determines the first and second threshold values as a function of the comparison.

4. The device as recited in claim 3, wherein the threshold value controller additionally takes into account a period of time the transverse and vertical accelerations have exceeded the first and second threshold values in the threshold value comparison.

5. The device as recited in claim 1, wherein the threshold value controller additionally takes into account a period of time the transverse and vertical accelerations have exceeded the first and second threshold values in the threshold value comparison.

6. A method for triggering a personal protection device in a rollover accident, comprising:
determining a roll rate using a roll rate sensor;
detecting a transverse acceleration and a vertical acceleration using an acceleration sensor;
integrating the roll rate to yield an angle using an integrator, where the integration starts when the roll rate exceeds a first threshold value and ends when the roll rate falls below a second threshold value;
adjusting the first or second threshold values as a function of the transverse and vertical acceleration; and
triggering the personal protection device as a function of the angle,
wherein the processor is adapted to determine a roll angle from the transverse and vertical accelerations and the threshold value controller adjusts the first and second threshold values as a function of the roll angle, and wherein the threshold value controller subjects the transverse and vertical accelerations to a threshold value comparison and determines the first and second threshold values as a function of the comparison.

7. The method as recited in claim 6, wherein a roll angle is determined from the transverse and vertical accelerations and the first and second threshold values are adjusted as a function of the roll angle.

8. The method as recited in claim 6, wherein the transverse and vertical accelerations are subjected to a threshold value comparison and the first and second threshold values are determined as a function of this comparison.

9. The method as recited in claim 8, wherein a period of time, during which the transverse acceleration and vertical accelerations are exceeded, is additionally taken into account in the threshold value comparison.

10. The method as recited in claim 6, wherein a period of time, during which the transverse acceleration and vertical accelerations are exceeded, is additionally taken into account in the threshold value comparison.

* * * * *

UNITED STATES PATENT AND TRADEMARK OFFICE
CERTIFICATE OF CORRECTION

PATENT NO.      : 8,433,480 B2                                               Page 1 of 1
APPLICATION NO. : 11/989877
DATED           : April 30, 2013
INVENTOR(S)     : Tichy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1399 days.

Signed and Sealed this
Eighth Day of September, 2015

Michelle K. Lee
*Director of the United States Patent and Trademark Office*